US009190079B1

United States Patent
Liu et al.

(10) Patent No.: US 9,190,079 B1
(45) Date of Patent: Nov. 17, 2015

(54) MAGNETIC WRITE POLE HAVING ENGINEERED RADIUS OF CURVATURE AND CHISEL ANGLE PROFILES

(71) Applicant: Western Digital (Fremont), LLC, Fremont, CA (US)

(72) Inventors: Feng Liu, San Ramon, CA (US); Tao Pan, San Jose, CA (US); Hai Sun, Milpitas, CA (US); Zhigang Bai, Fremont, CA (US); Yang Xiang, Fremont, CA (US); Yugang Wang, Milpitas, CA (US); Ling Wang, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/492,545

(22) Filed: Sep. 22, 2014

(51) Int. Cl.
G11B 5/127 (2006.01)
G11B 5/31 (2006.01)

(52) U.S. Cl.
CPC .......... G11B 5/1278 (2013.01); G11B 5/3116 (2013.01)

(58) Field of Classification Search
CPC .. G11B 5/3116; G11B 5/1278; G11B 5/3163; G11B 5/3146; G11B 5/127; G11B 5/3169; Y10T 29/49046; Y10T 29/49044; Y10T 29/49052; Y10T 29/49043
USPC .......... 360/125.3, 125.03, 125.14; 29/603.12, 29/603.14–603.16
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |

(Continued)

Primary Examiner — Will J Klimowicz

(57) ABSTRACT

A magnetic transducer has air-bearing surface (ABS) and includes a main pole and at least one coil. The coil(s) energize the main pole. The main pole includes a yoke and a pole tip having an ABS-facing surface. The pole tip includes a sidewall having a radius of curvature and a chisel angle. The chisel angle is measured between a yoke direction perpendicular to the ABS and a tangent the sidewall. The chisel angle for the pole tip continuously increases in the yoke direction to a maximum a first distance from the ABS-facing surface in the yoke direction. The radius of curvature for the pole tip has a minimum radius of curvature a second distance from the ABS-facing surface in the yoke direction. The first distance is greater than the second distance.

24 Claims, 8 Drawing Sheets

(56) References Cited

U.S. PATENT DOCUMENTS

| | | |
|---|---|---|
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |

(56) References Cited

U.S. PATENT DOCUMENTS

| | | |
|---|---|---|
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,556,915 B2 | 7/2009 | Lauchlan |
| 7,558,019 B2 | 7/2009 | Le et al. |
| 7,583,466 B2 | 9/2009 | Kermiche et al. |

(56) References Cited

U.S. PATENT DOCUMENTS

| | | |
|---|---|---|
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,018,679 B2 | 9/2011 | Hsiao et al. |
| 8,023,231 B2 | 9/2011 | Guan et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,094,419 B2 | 1/2012 | Guan |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,111 B2 | 9/2012 | Okada et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,411,287 B2 | 4/2013 | Smilde et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |

(56) References Cited

U.S. PATENT DOCUMENTS

| | | |
|---|---|---|
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 * | 8/2013 | Liu et al. ................... 360/125.1 |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,542,461 B2 | 9/2013 | Bai et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 * | 10/2013 | Medina et al. ............ 29/603.16 |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 * | 12/2013 | Liu et al. ................... 360/324.1 |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,656,319 B2 | 2/2014 | Kuo et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2010/0290157 A1 | 11/2010 | Zhang et al. |
| 2011/0075299 A1 | 3/2011 | Olson et al. |
| 2011/0086240 A1 | 4/2011 | Xiang et al. |
| 2011/0207056 A1 | 8/2011 | Pierrat et al. |
| 2011/0279920 A1 | 11/2011 | Takano et al. |
| 2012/0008236 A1 | 1/2012 | Lee et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0219348 A1 | 8/2013 | Ye et al. |
| 2013/0250286 A1 | 9/2013 | Han et al. |
| 2013/0257421 A1 | 10/2013 | Shang et al. |
| 2013/0342937 A1 | 12/2013 | Sugiyama et al. |
| 2014/0154529 A1 | 6/2014 | Yang et al. |
| 2014/0175050 A1 | 6/2014 | Zhang et al. |

* cited by examiner

MAGNETIC WRITE POLE HAVING ENGINEERED RADIUS OF CURVATURE AND CHISEL ANGLE PROFILES

BACKGROUND

FIGS. 1A and 1B depict air-bearing surface (ABS) and plan views of a conventional magnetic recording head 10. The magnetic recording transducer 10 may be a perpendicular magnetic recording (PMR) head. The conventional magnetic recording transducer 10 may be a part of a merged head including the write transducer 10 and a read transducer (not shown). Alternatively, the magnetic recording head may be a write head including only the write transducer 10. The conventional transducer 10 includes an underlayer 12 that may include a leading shield, side gap 14, side shields 16, top (write) gap 17, optional top shield 18 and main pole 20.

The side shields 16 are separated from the main pole 20 by a side gap 14. The side shields 16 extend a distance back from the ABS. The gap 14 between the side shields 16 and the main pole 20 may have a substantially constant thickness. Thus, the side shields 16 are conformal with the main pole 20.

The main pole 20 resides on an underlayer 12 and includes sidewalls 22 and 24. The underlayer 12 may include a leading shield. The sidewalls 22 and 24 of the conventional main pole 20 form an angle with the down track direction at the ABS. Thus, the top of the main pole 20 is wider than its bottom. In addition, sidewalls of the pole tip forms a chisel angle with the yoke direction (i.e. perpendicular to the ABS) at and near the ABS. Typically, the chisel angle is constant at and near the ABS.

Although the transducer 10 functions, performance of the transducer 10 may suffer at higher recording densities. For example, in the range of close to or above one Tb/in$^2$, the main pole 20 is scaled down in size. In this size range, the reduction in the physical geometry of the main pole 20 may result in a loss in write field. Further, reverse overwrite may also suffer. Thus, performance of the conventional transducer 10 may suffer at higher recording densities.

DETAILED DESCRIPTION OF THE PREFERRED EMBODIMENTS

Figure 1A:
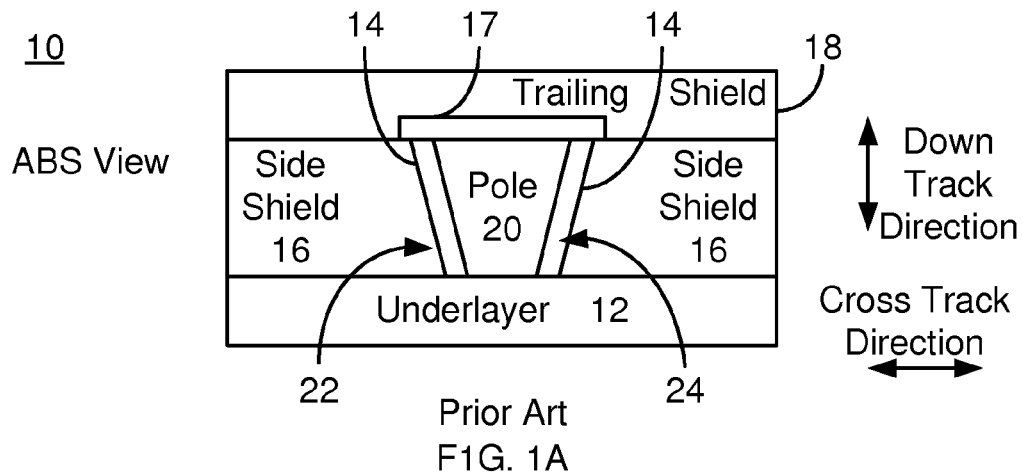
FIGS. 1A-1B depict ABS and plan views of a conventional magnetic recording head.
Figure 1B:
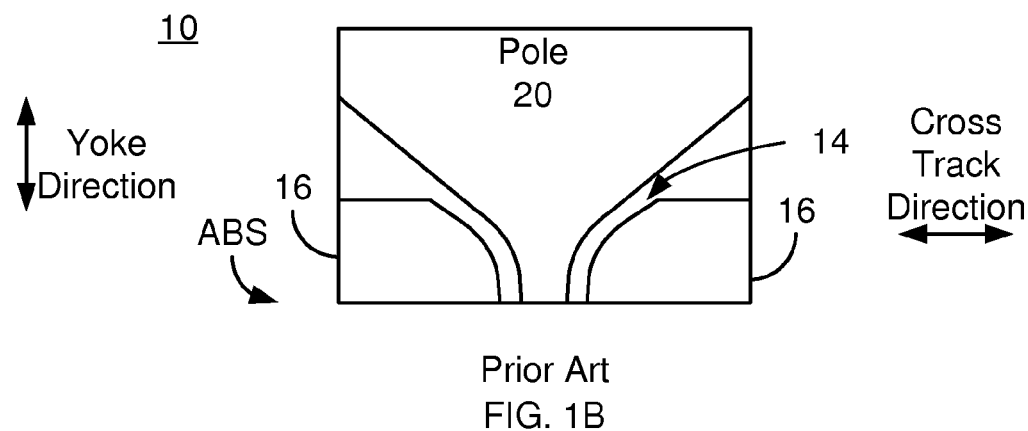
Figure 2A:
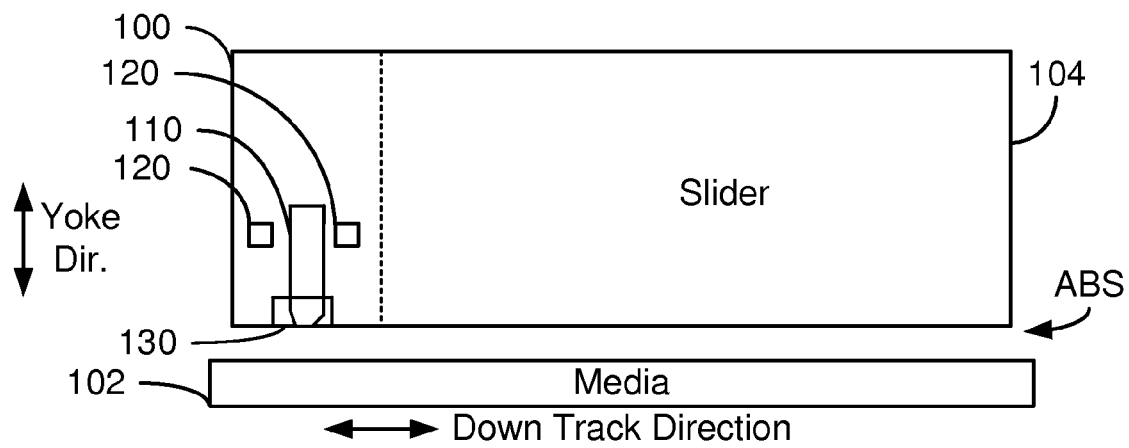
FIGS. 2A, 2B and 2C depict side, ABS and plan views of an exemplary embodiment of a magnetic recording disk drive and transducer.
Figure 2B:
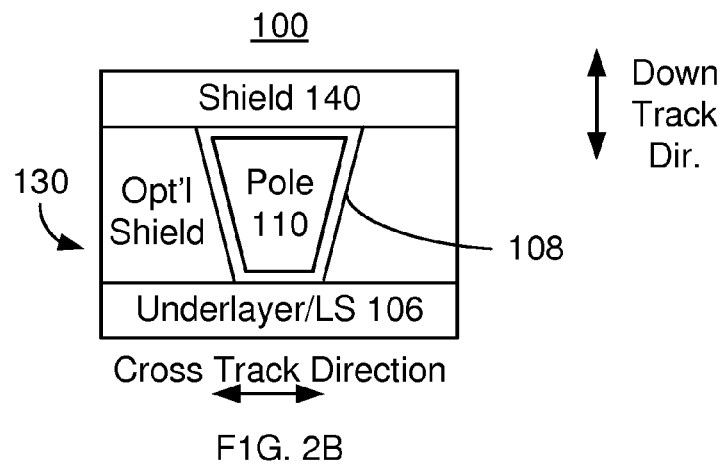
Figure 2C:
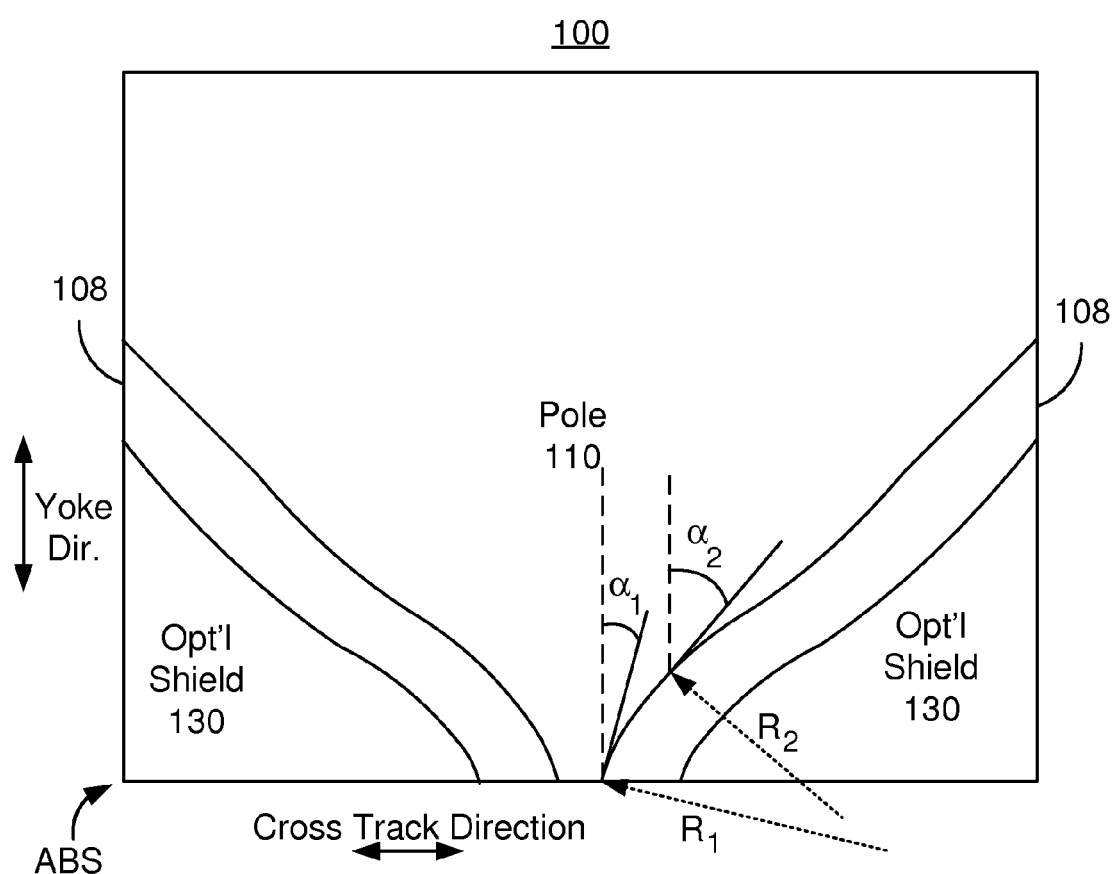

FIGS. 2A, 2B and 2C depict various views of an exemplary embodiment of a disk drive and transducer 100. FIG. 2A depicts a side view of the disk drive. FIGS. 2B and 2C depict ABS and plan views of portions of the transducer 100. For clarity, FIGS. 2A-2C are not to scale. For simplicity not all portions of the disk drive and transducer 100 are shown. In addition, although the disk drive and transducer 100 are depicted in the context of particular components other and/or different components may be used. For example, circuitry used to drive and control various portions of the disk drive is not shown. For simplicity, only single components are shown. However, multiples of each components and/or their sub-components, might be used. The disk drive may be a perpendicular magnetic recording (PMR) disk drive. However, in other embodiments, the disk drive 200 may be configured for other types of magnetic recording included but not limited to heat assisted magnetic recording (HAMR).

The disk drive includes a media 102, and a slider 104 on which a transducer 100 has been fabricated. Although not shown, the slider 104 and thus the transducer 100 are generally attached to a suspension. In general, the slider 104 includes the write transducer 100 and a read transducer (not shown). However, for clarity, only the write transducer 100 is shown.

The transducer 100 includes an underlayer 106, an intermediate layer (not shown in FIGS. 2B and 2C), a main pole 110, coil(s) 120, side shields 130 and trailing shield 140. The underlayer 106 may include a leading shield (LS) at and near the ABS. The coil(s) 120 are used to energize the main pole 110. One turn is depicted in FIG. 2A. Another number of turns may, however, be used. Typically, multiple turns are used. Note that only a portion of the coil(s) 120 may be shown in FIG. 2A. If, for example, the coil(s) 120 is a spiral, or pancake, coil, then additional portions of the coil(s) 120 may be located further from the ABS. Alternatively a helical may be used. Further, additional coils may also be used.

Also shown is a gap 108. In some embodiment, the side gap 108 also functions as a leading gap between a leading shield and the main pole 110 and a write gap between the main pole 110 and the trailing shield 140. In other embodiments, other layer(s) may form all or part of the leading gap and/or the write gap. In the embodiment shown in FIGS. 2B-2C, the side shields 130 are conformal in the region of the pole tip. However, in other embodiments, some portion of the side shields 130 may be nonconformal. In addition, the side shields 130, trailing shield 140 and leading shield 106 may be configured differently or omitted. For example, the shields 130, 140 and leading shield of underlayer 106 may form a wraparound shield. In other embodiments, the side shield 130 may be configured as a half shield which terminates between the top and bottom of the pole 110. In such embodiments, the trailing shield 140 may be used but the leading shield in the underlayer 106 omitted. In other embodiments, one or more of the leading shield, side shields 130 and trailing shield 140 may be omitted or configured differently.

The main pole 110 includes a yoke region and a pole tip that has an ABS-facing surface. The ABS-facing surface may reside at the ABS. Such an embodiment is depicted in FIGS. 2A-2C. In other embodiments, the ABS-facing surface may be recessed from the ABS. The pole tip is a region proximate to the ABS and is between the yoke and the ABS. In some embodiments, the pole tip extends not more than five hundred nanometers from the ABS in the yoke direction (perpendicular to the ABS). In other embodiments, the pole tip extends not more than four hundred fifty nanometers from the ABS. In some such embodiments, the pole tip extends not more than two hundred nanometers from the ABS in the yoke direction. In some embodiments, the pole tip may be considered to extend up to a location for which the chisel angle, discussed below, becomes constant. Behind the pole tip (e.g. in the yoke region), the chisel angle may is considered to be replaced by another quantity, such as a flare angle.

In FIG. 2B, the main pole 110 is shown as having a top wider than the bottom. The pole tip of the main pole 110 thus includes sidewalls having sidewall angles that are greater than or equal to zero with respect to the down track direction. In an embodiment, these sidewall angles differ at different distances from the ABS.

The sidewalls also from a chisel angle with the yoke direction, as can be seen in FIG. 2C. The chisel angle is the angle that a tangent to the sidewall forms with the yoke direction. For clarity, only two chisel angles, $\alpha_1$ and $\alpha_2$, for one sidewall are shown. The variations in the chisel angles for the two sidewalls of the main pole 110 may be substantially the same. Thus, the main pole 110 is symmetric. However, in other embodiments, the main pole 110 may not be symmetric. This lack of symmetry may be because of a design or due to fabrication.

Further, the sidewalls may also be characterized by a radius of curvature. The radius of curvature at a point along the sidewall is the radius of a circle having a curvature substantially matching that of the sidewall at that point and is perpendicular to the tangent to the sidewall at the point. Thus, as can be seen in FIG. 2C, the radius of curvature is perpendicular to the tangent that forms the chisel angle. For clarity, the radii of curvature are shown for only two points along a sidewall. Thus, one location has a chisel angle $\alpha_1$ and a radius of curvature $R_1$ while the other location has a chisel angle $\alpha_2$ and a radius of curvature $R_2$.

The pole tip is configured such that the chisel angle for the pole tip continuously increases in the yoke direction to a maximum a first distance from the ABS, while the radius of curvature for the pole tip has a minimum radius of curvature a second distance from the ABS in the yoke direction. The first distance is greater than the second distance. Stated differently, the maximum in the chisel angle occurs at a location further from the ABS than the location of the minimum in the radius of curvature. In some embodiments, the minimum of the radius of curvature may occur at the ABS-facing surface of the pole tip. The radius of curvature may change smoothly through the minimum in the radius of curvature. Similarly, the chisel angle may change smoothly through the maximum in the chisel angle. Thus, the chisel angle and/or radius of curvature may follow smooth curves For example, in some embodiments, the chisel angle is at least ten degrees and not more than thirty degrees at the ABS-facing surface. In some such embodiments, the chisel angle is at least fifteen degrees and not more than twenty-five degrees at the ABS-facing surface. The chisel angle smoothly increases with distance from the ABS in the yoke direction to a maximum. In some embodiments, this maximum is greater than fifty degrees. In some embodiments, the maximum in the chisel angle occurs at least one hundred and not more than two hundred nanometers from the ABS-facing surface. In other embodiments, other distances are possible. In general, however, it is desirable for the minimum in the radius of curvature to occur closer to the ABS-facing surface (e.g. the ABS) than the maximum in the chisel angle. In some embodiments, the chisel angle smoothly decreases from the maximum as the distance from the ABS increases further. The chisel angle may then become constant some distance from the ABS. These changes in the chisel angle may also be smooth. In other words, over this region (the pole tip) the chisel angle follows a curve having no sharp corners. As discussed above, at some location greater than or equal to the distance from the ABS at which the chisel angle becomes constant, the pole tip may be considered to terminate.

In contrast to the chisel angle, the radius of curvature has a minimum some distance from the ABS-facing surface. In some embodiments, this distance is at least zero nanometers and not more than eighty nanometers. Thus, the minimum may occur at the closest portion of the main pole 110 to the ABS, including at the ABS. In other embodiments, the minimum is at least twenty nanometers from the ABS-facing surface. In some such embodiments, the minimum is a distance from the ABS-facing surface of at least forty nanometers and not more than sixty nanometers.

Figure 3A:
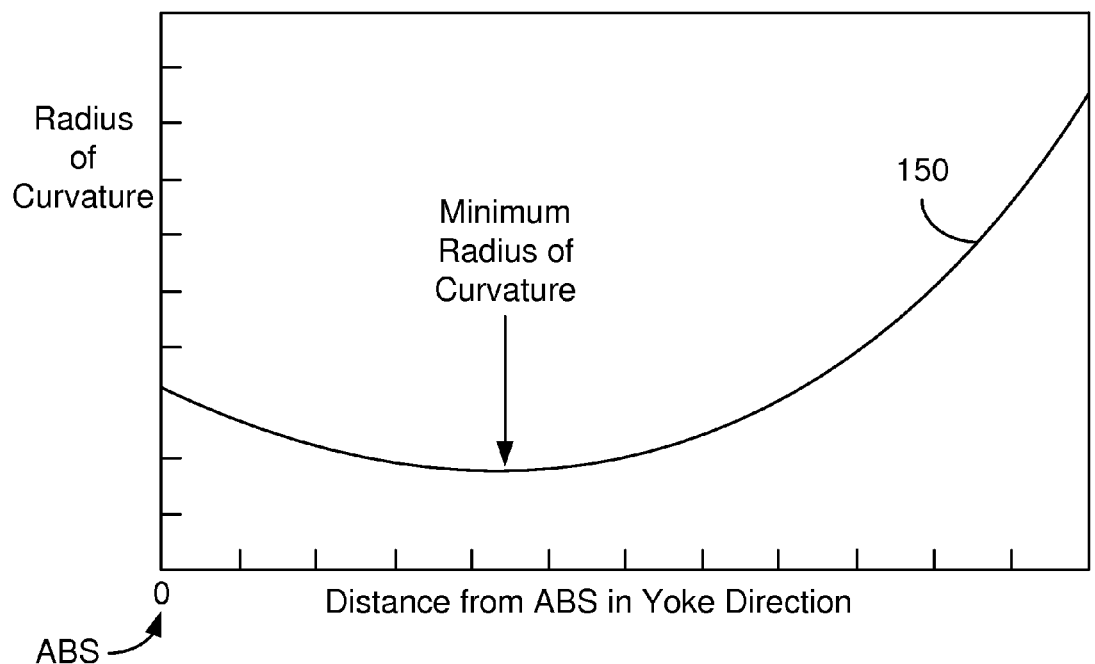
FIGS. 3A and 3B depict radius of curvature and chisel angle versus distance from the ABS in one embodiment of a magnetic recording transducer.
Figure 3B:
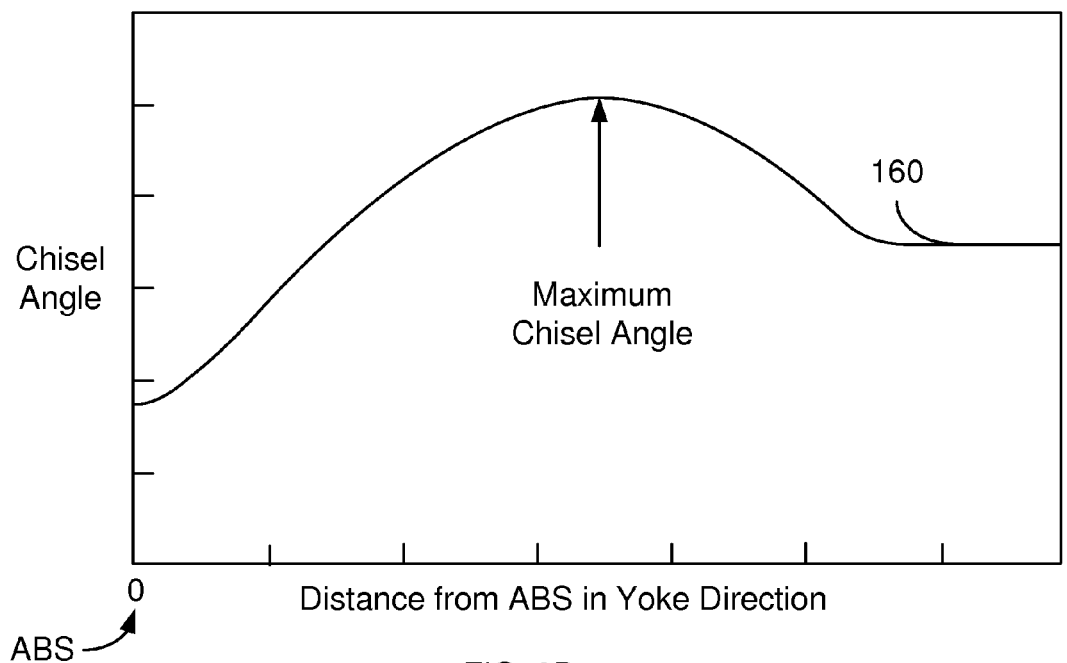

Thus, both the chisel angle and radius of curvature change smoothly through the pole tip. The minimum in the radius of curvature occurs at a location for which the chisel angle is increasing smoothly. Stated differently, the minimum in the radius of curvature is closer to the ABS than the maximum in the chisel angle. Comparisons of the radius of curvature and chisel angle may be seen in FIGS. 3A-5B. FIGS. 3A and 3B depict graphs 150 and 160, respectively, of the radius of curvature and chisel angle versus distance from the ABS. FIGS. 3A and 3B are not to scale and may have different scales for horizontal and/or vertical axes. In a main pole 110 corresponding to the graphs 150 and 160, the ABS-facing surface of the main pole 110 is at the ABS. As can be seen in FIGS. 3A and 3B, the radius of curvature changes smoothly through the minimum. As can be seen in FIG. 3A, the radius of curvature decreases continuously (e.g. with no increase) to the minimum and increases continuously further from the ABS than the minimum. Stated differently, the radius of curvature monotonically decreases, then monotonically increases. However, for other embodiments, the slope and shape of the curve may differ. For example, if the minimum in the radius of curvature is at the ABS/ABS-facing surface, then the radius of curvature will simply smoothly and monotonically increase. Similarly, the chisel angle changes smoothly through the maximum and through the constant chisel angle further from the ABS. As can be seen from the graph 160, the chisel angle increases continuously through the maximum, then decreases smoothly further from the ABS. The chisel angle becomes constant further from the ABS, at or near termination of the pole tip. Thus, the chisel angle monotonically increases, then monotonically decreases, and then becomes constant.

Figure 4A:
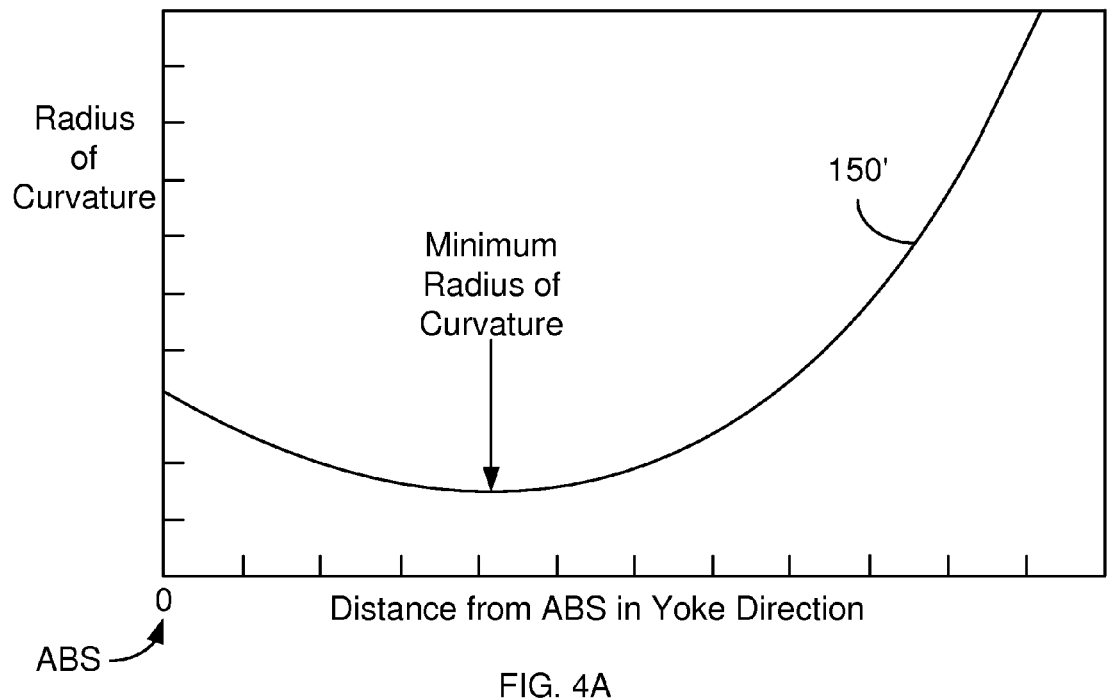
FIGS. 4A and 4B depict radius of curvature and chisel angle versus distance from the ABS in one embodiment of a magnetic recording transducer.
Figure 4B:
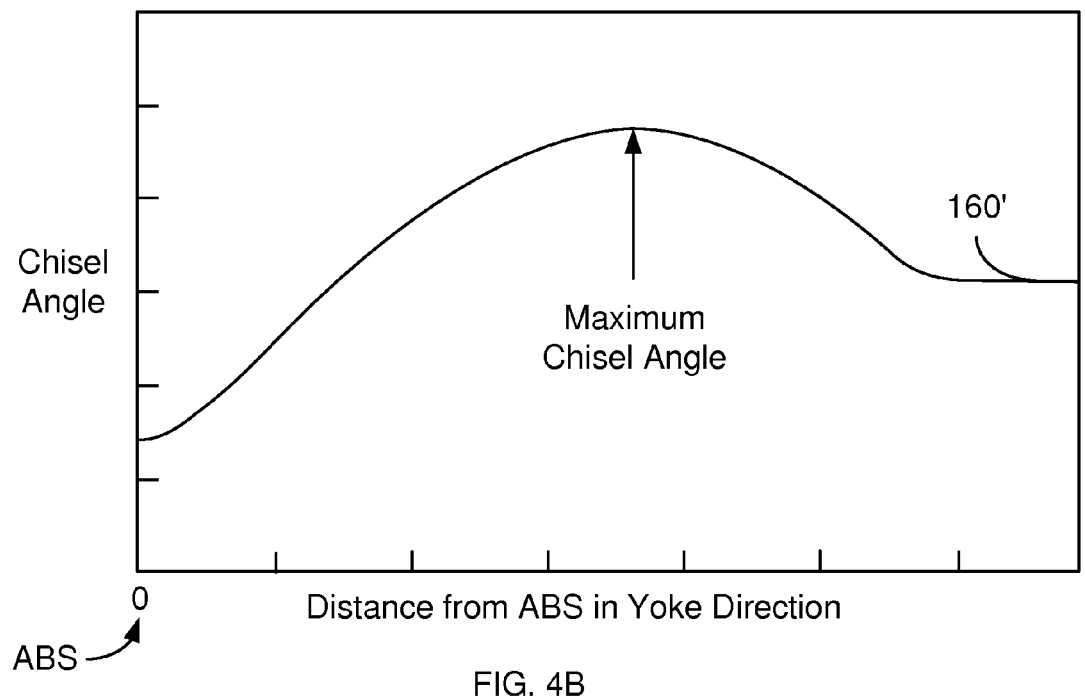

Although particular curves are depicted in FIGS. 3A and 3B, the radius of curvature and chisel angle are not limited to this dependence. For example, FIGS. 4A and 4B depict graphs 150' and 160' of radius of curvature and chisel angle for another embodiment of the main pole 110. FIGS. 4A and 4B are not to scale and may have different scales for horizontal and/or vertical axes. Although shaped differently, the general trends are the same as for the graphs 150 and 160. For example, the radius of curvature in graph 150' and chisel angle in graph 160' vary smoothly with distance from the ABS-facing surface (here, the ABS). The radius of curvature monotonically decreases, then monotonically increases in graph 150'. Thus, the chisel angle of graph 160' monotonically increases, then monotonically decreases, and then becomes constant. Further, the minimum in the radius of curvature is closer to the ABS than the maximum in the chisel angle.

Figure 5A:
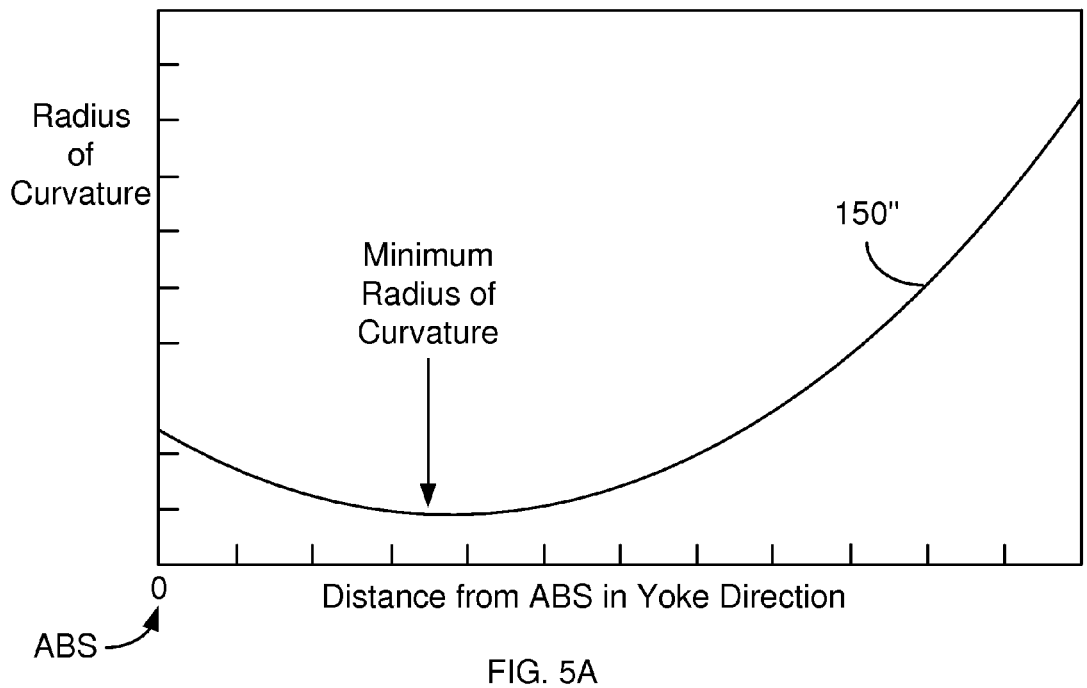
FIGS. 5A and 5B depict radius of curvature and chisel angle versus distance from the ABS in one embodiment of a magnetic recording transducer.
Figure 5B:
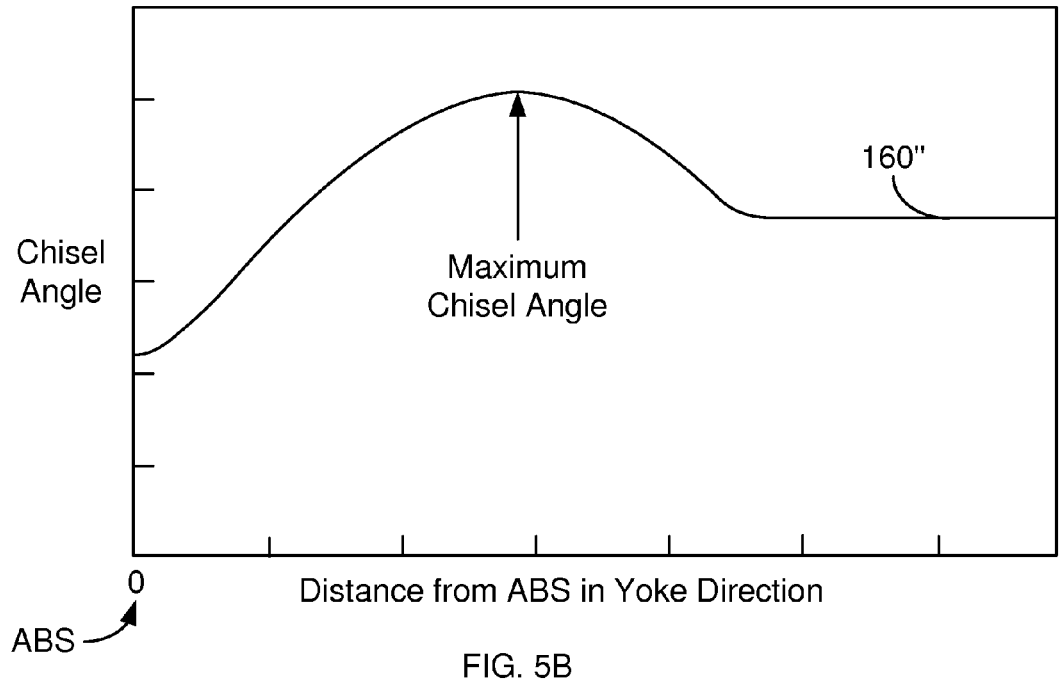

FIGS. 5A and 5B depict graphs 150" and 160" of radius of curvature and chisel angle for still another embodiment of the main pole 110. FIGS. 5A and 5B are not to scale and may have different scales for horizontal and/or vertical axes. Although shaped differently, the general trends are the same as for the graphs 150 and 160. For example, the radius of curvature in graph 150″ and chisel angle in graph 160′ vary smoothly with distance from the ABS-facing surface (here, the ABS). The radius of curvature monotonically decreases, then monotonically increases in graph 150″. Thus, the chisel angle of graph 160″ monotonically increases, then monotonically decreases, and then becomes constant. Further, the minimum in the radius of curvature is closer to the ABS than the maximum in the chisel angle.

The magnetic transducer 100 may have improved performance, particularly at higher recording densities. The desired profile of the pole 110, particularly the radius of curvature and chisel angle discussed above, may increase the effective magnetic volume of the pole 110 near the ABS. For example, a small radius of curvature corresponds to a more rapid increase in volume of magnetic material. This increase in volume results in a higher magnetic field due to the main pole 110. This increase may cause an increase in the write field magnitude and gradient. Thus, writability of the main pole 110 may be enhanced. In addition, other aspects of performance, such as the error margin may be improved. Other issues, such as adjacent track interference and wide area track erasure, may be comparable. Thus, overall performance of the transducer 100 may be improved.

Figure 6:
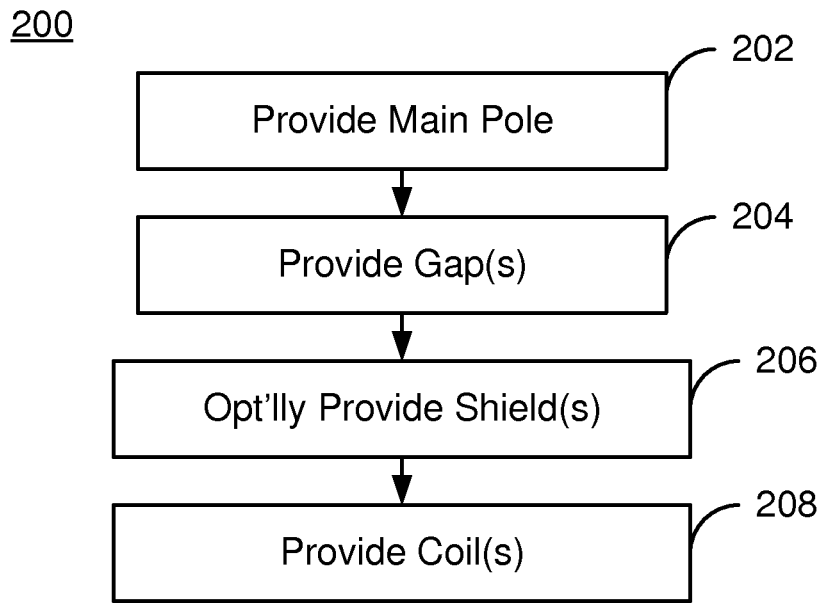
FIG. 6 depicts a flow chart of an exemplary embodiment of a method for providing a magnetic recording transducer.

FIG. 6 depicts an exemplary embodiment of a method 200 for providing a magnetic recording transducer. For simplicity, some steps may be omitted, interleaved, combined and/or performed in another order. The method 200 is described in the context of providing a single magnetic recording disk drive and transducer 100. However, the method 200 may be used to fabricate multiple magnetic recording transducers at substantially the same time and may be used to fabricate other transducers. The method 200 is also described in the context of particular layers. A particular layer may include multiple materials and/or multiple sub-layers. The method 200 also may start after formation of other portions of the magnetic recording head. For example, the method 200 may start after a read transducer, return pole/shield and/or other structure have been fabricated. In addition, an intermediate layer, such as an aluminum oxide layer, in which the pole is formed has been fabricated.

The main pole 110 is provided, via step 202. Step 202 may include forming a trench in one or more layers that corresponds to the pole footprint (e.g. the plan view). For example, a photoresist mask having the desired shape may be provided on an intermediate layer. Hard mask layer(s) may be deposited on the photoresist mask and the photoresist mask removed. The hard mask so formed has an aperture having a shape corresponding to the photoresist mask. An etch or other removal process may then be performed in order to form the trench corresponding to the main pole. The trench formed has the desired geometry and location for formation of the main pole. For example, the top of the trench may be wider than the bottom so that the top of the main pole may be wider than the bottom. If a leading edge bevel is desired, the bottom of the trench may slope in the yoke direction. The trench may also be narrower in the pole tip region, near the ABS, than in the yoke region recessed from the ABS. The sidewalls of the trench may also be provided such that the desired radius of curvature and chisel angle may be provided. After formation of other structures, such as a bottom or side gap, the formation of the main pole 110 may be completed by deposition of magnetic pole materials and, in some embodiments, a planarization or other process that removes any excess pole materials. In some embodiments, this portion of step 202 includes plating or otherwise depositing high saturation magnetization magnetic material(s). Further, a top, or trailing, bevel may be formed in the main pole 110. Formation of the trailing bevel may include covering a portion of the main pole recessed from the ABS and then ion milling the main pole at an angle from the down track direction. This step may be performed after or interleaved with formation of the side shields. The trench may also have been configured in step 202 such that the depth varies in the pole tip region. Thus, the main pole may also have a bottom, or leading, bevel.

The bottom, side and/or write gap(s) are provided, via step 204. Step 204 may include depositing one or more nonmagnetic layers such that the bottom and side gaps are formed in the trench. If a nonconformal side gap is desired, additional masking and/or deposition steps may also be performed. At least part of step 204 may also be performed before deposition of the pole material(s) in step 202. However, formation of the write gap is carried out after the pole materials have been provided.

The shield(s) 106, 130 and/or 140 are optionally provided, via step 206. Step 206 may include covering a portion of the transducer with a mask, removing some portion(s) of the intermediate layer and plating or otherwise providing the material(s) for the side shields. In some embodiments, the side shields 130 may be formed before the main pole 110 is formed.

The coils 120 may also be formed, via step 208. Step 208 includes multiple masking and deposition steps that may be performed before and/or after the steps 202, 204 and 206. For example, if the coil 120 is a spiral coil, then step 208 may be completed before the steps 202, 204 and 206. In other embodiments, the coil 120 may be a toroidal (helical) coil, some of which is formed before the main pole 120 and some of which may be formed after the main pole 110.

Using the method 200, a magnetic transducer having improved performance may be fabricated. In particular, the magnetic field magnitude, gradient in the magnetic field and other properties may be enhanced. Thus, fabrication and performance of the transducer may be improved.

Figure 7:
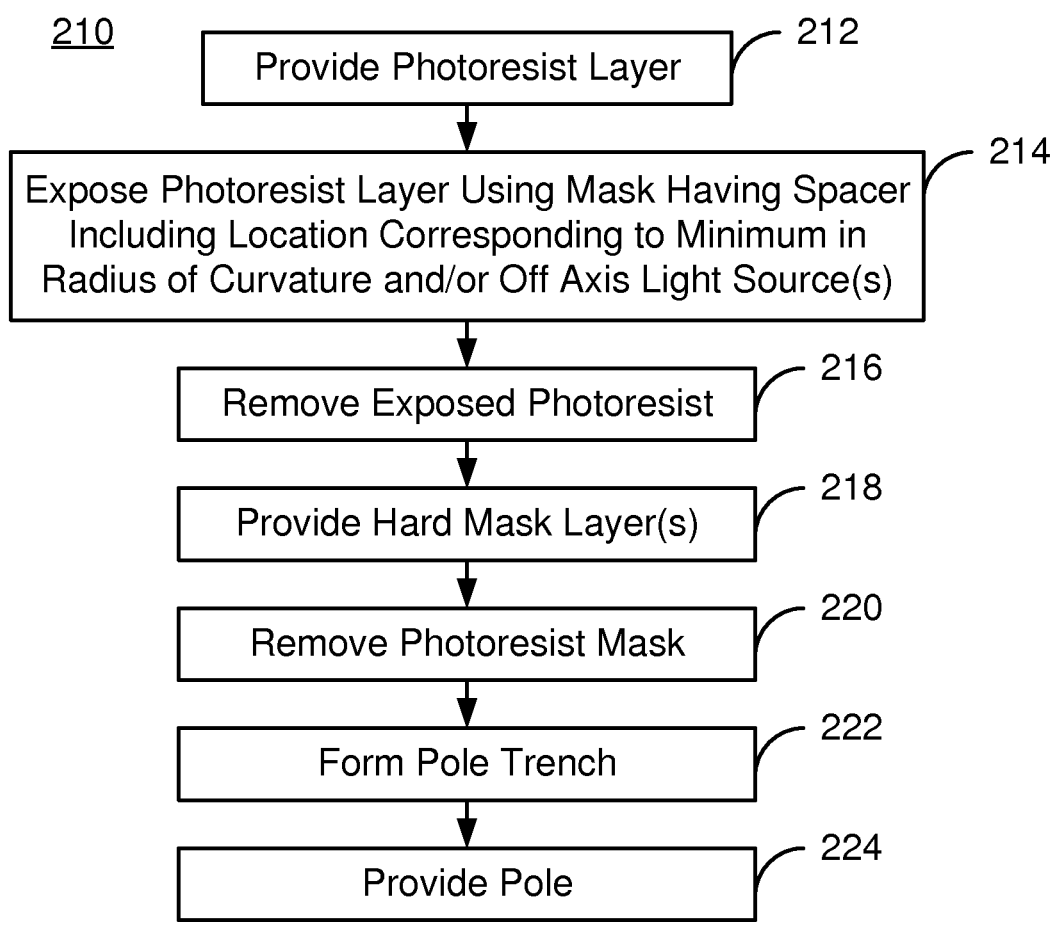
FIG. 7 depicts a flow chart of another exemplary embodiment of a method for providing a magnetic recording transducer.

FIG. 7 depicts an exemplary embodiment of a method 210 for providing a main pole 110 in a magnetic recording transducer. For simplicity, some steps may be omitted, interleaved, and/or combined. FIGS. 8A-8B through 12A-12C depict various views of a mask 250 and a transducer 260 during fabrication using the method 210. For clarity, FIGS. 8A-12C are not to scale. For simplicity not all portions of the disk drive and transducer 260 are shown. In addition, although the disk drive and transducer 260 are depicted in the context of particular components other and/or different components may be used. For example, circuitry used to drive and control various portions of the disk drive is not shown. For simplicity, only single components are shown. However, multiples of each components and/or their sub-components, might be used. The disk drive including the transducer 260 may be a PMR disk drive. However, in other embodiments, the disk drive may be configured for other types of magnetic recording included but not limited to HAMR.

The method 210 is described in the context of providing a magnetic recording disk drive and transducer 260. However, the method 210 may be used to fabricate multiple magnetic recording transducers at substantially the same time. The method 210 may also be used to fabricate other magnetic recording transducers. The method 210 is also described in the context of particular layers. A particular layer may include multiple materials and/or multiple sub-layers. The method 210 also may start after formation of other portions of the magnetic recording head. For example, the method 210 may start after a read transducer, return pole/shield and/or other structure have been fabricated. The method 210 may also start after an intermediate layer, such as silicon oxide and/or aluminum oxide has been provided. Thus, the intermediate layer may be nonmagnetic and may include multiple constituents.

A photoresist layer is provided on the intermediate layer, via step 212. The photoresist layer may be spin coated on the intermediate layer or provided in another manner.

Figure 8A:
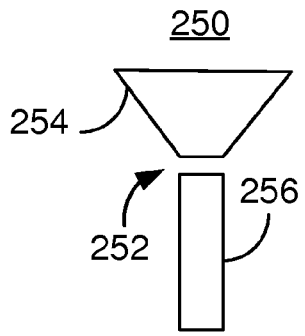
FIG. 8A-8B through 12A-12B depict various views of an exemplary embodiment of a mask and an exemplary embodiment of a magnetic recording transducer during fabrication using the mask.
Figure 8B:
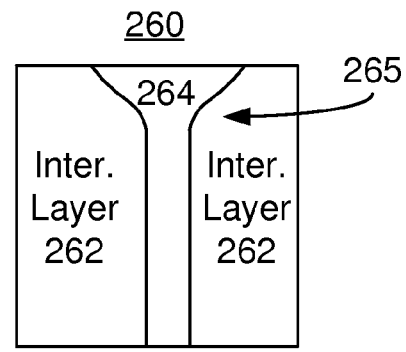

The photoresist layer is exposed to light using a mask having a shape corresponding to the pole tip, via step 214. The shape of the mask includes a spacer therein. The spacer covers a region corresponding to the minimum in the radius of curvature of the main pole being formed. The exposure may also be performed using off-axis illumination. For example, in some embodiments, quadrupole illumination may be used. A portion of the photoresist layer is removed, via step 216. Step 216 may include using a developer to remove the exposed portions of the photoresist layer. FIG. 8A depicts the mask 250 used in step 214. FIG. 8B is a plan view of the transducer 260 after step 216 is performed. The mask 250 used in illuminating the photoresist layer includes sections 254 and 256 having a spacer 252 between the two sections. The intermediate layer 262 and photoresist mask 264 formed using the mask 250 are shown in FIG. 8B. The minimum in radius of curvature occurs within region 265. The region 265 in the photoresist mask 264 corresponds to the spacer 252. This region 265 includes the location at which the radius of curvature is a minimum for the pole being formed.

Figure 9:
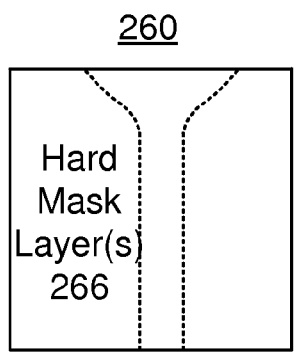

One or more hard mask layers are deposited, via step 218. FIG. 9 depicts a plan view of the transducer 260 after step 218 has been performed. Thus, a hard mask layer 266 is shown. The location of the photoresist mask 264 is indicated by dashed lines in FIG. 9.

Figure 10:
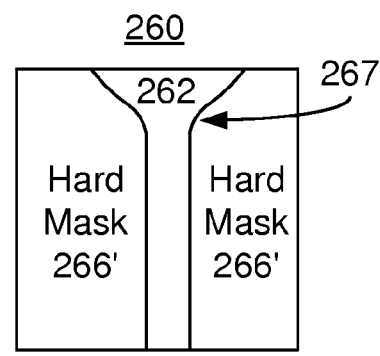

The photoresist mask 264 is removed, via step 220. Step 220 may include using a lift-off process. FIG. 10 depicts a plan view of the transducer 260 after step 220 has been completed. The photoresist mask 264 and portion of the hardmask layer(s) 266 on the photoresist mask 264 have been removed. Thus, a hard mask 266' remains. The hard mask 266' includes a region 267 that corresponds to the spacer 252 in the mask 250 depicted in FIG. 8A. Referring back to FIG. 10, the underlying intermediate layer 262 is exposed by the hard mask 266'. This exposed portion of the intermediate layer 262 has substantially the same shape and location as the photoresist mask 264.

Figure 11A:
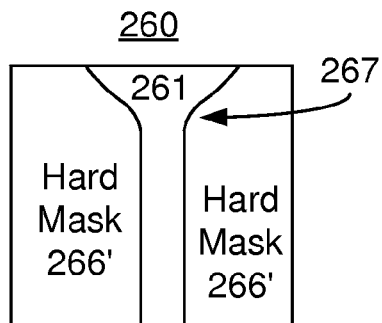
Figure 11B:
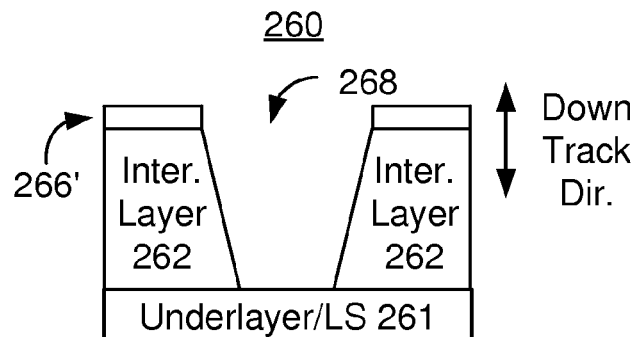

A portion of the intermediate layer 262 is removed, via step 222. A trench for the main pole is thus formed. Step 222 may include performing one or more reactive ion etches (RIEs). In some embodiments, the RIE(s) and/or the intermediate layer 254 are configured such that the trench has different sidewall angles in different portions of the pole. For example, the sidewall angles at and near the ABS may be larger (further from perpendicular to the surface of the intermediate layer) than the sidewall angles in regions recessed from the ABS (termed the yoke herein). FIGS. 11A and 11B depict plan and ABS location views of the transducer 260 after the trench has been provided by removal of the intermediate layer 262 under the aperture in the hard mask 266'. Thus, a trench 268 has been formed. The trench may expose the underlying topology. For example, the underlayer/leading shield 261 may be exposed. In other embodiments, the bottom of the trench may be in the intermediate layer 262. The trench 268 has a top wider than the bottom at the ABS and a shape corresponding to the pole.

Figures 12A, 12B:
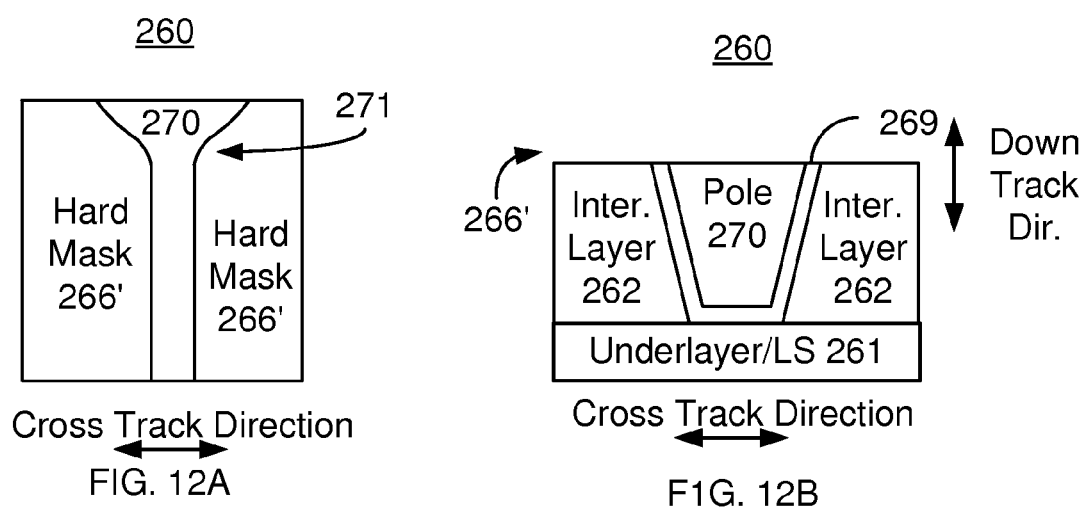

The main pole is provided, via step 224. High saturation magnetization magnetic material(s) may thus be provided by plating and/or other means. In addition, other portions of the pole may be formed using other material(s). The main pole material(s) may also be planarized. A trailing bevel may also be formed. FIGS. 12A and 12B depict plans and ABS views of the transducer 260 after step 224 has been performed. Although not indicated in the method 210, a gap 269 has also been formed. The pole 270 is also present. The main pole 270 has a top wider than the bottom at least in the pole tip. The radius of curvature and chisel angle are also configured as discussed above for the main pole 110. The main pole 270 thus has a region 271 in which the minimum of the radius of curvature occurs. This region 271 corresponds to the spacer 252 in the mask 250. Fabrication of the transducer 260 may be completed.

Using the method 210, a magnetic transducer 260 having improved performance may be fabricated. In particular, use of the mask 250 in illuminating/exposing the photoresist layer results in the desired profile of the photoresist mask 262. This allows the main pole 270 to have the desired shape, particularly for the chisel angle and radius of curvature of the main pole. The magnetic field magnitude, gradient in the magnetic field and other properties for the main pole 270 may thus be improved. Thus, performance of the transducer may be enhanced.

We claim:

1. A magnetic transducer having air-bearing surface (ABS) comprising:
    a main pole including a yoke and a pole tip having an ABS-facing surface, the pole tip including a sidewall having a radius of curvature and a chisel angle measured between a yoke direction perpendicular to the ABS and a tangent the sidewall, the chisel angle for the pole tip continuously increasing in the yoke direction from a first chisel angle at the ABS-facing surface to a maximum a first distance from the ABS-facing surface in the yoke direction, the radius of curvature for the pole tip having a minimum radius of curvature a second distance from the ABS-facing surface in the yoke direction, the first distance being greater than the second distance; and
    at least one coil for energizing the main pole.

2. The magnetic transducer of claim 1 wherein the pole tip extends not more than five hundred nanometers from the ABS-facing surface.

3. The magnetic transducer of claim 2 wherein the pole tip extends not more than four hundred and fifty nanometers from the ABS-facing surface.

4. The magnetic transducer of claim 2 wherein the pole tip extends not more than a third distance from the ABS-facing surface, the third distance being a location for which the chisel angle becomes constant.

5. The magnetic transducer of claim 1 wherein the chisel angle changes smoothly through at least the maximum.

6. The magnetic transducer of claim 1 wherein the radius of curvature changes smoothly at least through the minimum.

7. The magnetic transducer of claim 1 wherein the chisel angle is at least ten degrees and not more than thirty degrees at the ABS-facing surface.

8. The magnetic transducer of claim 7 wherein the chisel angle is at least fifteen degrees and not more than twenty-five degrees at the ABS-facing surface.

9. The magnetic transducer of claim 1 wherein the second distance of the minimum from the ABS-facing surface is at least zero nanometers and not more than eighty nanometers.

10. The magnetic transducer of claim 9 wherein the second distance is at least twenty nanometers.

11. The magnetic transducer of claim 9 wherein the second distance is at least forty and not more than sixty nanometers.

12. The magnetic transducer of claim 1 wherein the chisel angle decreases in the yoke direction from the maximum from the first distance to at least a third distance from the ABS-facing surface in the yoke direction and wherein the radius of curvature for the pole tip increases from the second distance to at least a fourth distance from the ABS-facing surface in the yoke direction.

13. The magnetic transducer of claim 12 wherein the chisel angle decreases to a constant value at the third distance.

14. The magnetic transducer of claim 1 further comprising:
a side gap; and
at least one side shield, the side gap being between the main pole and the at least one side shield.

15. A data storage device comprising:
a media;
a slider including a magnetic recording transducer having an air-bearing surface (ABS), a main pole and at least one coil for energizing the main pole, the main pole including a yoke and a pole tip having an ABS-facing surface, the pole tip including a sidewall having a radius of curvature and a chisel angle measured between a yoke direction perpendicular to the ABS and a tangent the sidewall, the chisel angle for the pole tip continuously increasing in the yoke direction from a first chisel angle at the ABS-facing surface to a maximum a first distance from the ABS-facing surface in the yoke direction, the radius of curvature for the pole tip being a minimum radius of curvature a second distance from the ABS-facing surface in the yoke direction, the first distance being greater than the second distance.

16. The data storage device of claim 15 wherein the chisel angle changes smoothly through at least the maximum, the chisel angle being at least fifteen and not more than twenty-five degrees at the ABS-facing surface;
wherein the radius of curvature changes smoothly at least through the minimum;
wherein the second distance of the minimum from the ABS-facing surface is at least zero nanometers and not more than eighty nanometers, the second distance being less than the first distance.

17. The data storage device of claim 16 wherein the chisel angle decreases in the yoke direction from the maximum from the first distance to at least a third distance from the ABS-facing surface in the yoke direction and wherein the radius of curvature for the pole tip increases from the second distance to at least a fourth distance from the ABS-facing surface in the yoke direction.

18. The data storage device of claim 17 wherein the chisel angle decreases to a constant value at the third distance.

19. A method for fabricating a magnetic transducer having an air-bearing surface (ABS) location, the method comprising:

providing a main pole including a yoke and a pole tip having an ABS-facing surface, the pole tip including a sidewall having a radius of curvature and a chisel angle measured between a yoke direction perpendicular to the ABS and a tangent the sidewall, the chisel angle for the pole tip continuously increasing in the yoke direction from a first chisel angle at the ABS-facing surface to a maximum a first distance from the ABS-facing surface in the yoke direction, the radius of curvature for the pole tip being a minimum radius of curvature at a second distance from the ABS-facing surface in the yoke direction, the first distance being greater than the second distance; and providing at least one coil for energizing the main pole.

20. The method of claim 19 wherein the chisel angle changes smoothly through at least the maximum, the chisel angle being at least fifteen and not more than twenty-five degrees at the ABS-facing surface;
wherein the radius of curvature changes smoothly at least through the minimum;
wherein the second distance between the minimum and the ABS-facing surface is at least zero nanometers and not more than eighty nanometers, the second distance being less than the first distance.

21. The method of claim 20 wherein the chisel angle decreases in the yoke direction from the maximum from the first distance to at least a third distance from the ABS-facing surface in the yoke direction and wherein the radius of curvature for the pole tip increases from the second distance to at least a fourth distance from the ABS-facing surface in the yoke direction.

22. The method of claim 21 wherein the chisel angle decreases to a constant value at the third distance.

23. The method of claim 19 wherein the step of providing the main pole further includes:
depositing a photoresist layer corresponding to the main pole;
exposing the photoresist layer using a mask having a shape corresponding to the pole tip, the shape including a spacer therein, the second distance corresponding to a portion of the spacer;
removing a portion of the photoresist layer, a remaining portion of the photoresist layer forming a photoresist mask for the main pole.

24. The method of claim 23 further comprising:
depositing a hard mask layer on the photoresist mask;
removing the photoresist mask to form a hard mask for the main pole.

* * * * *